United States Patent
Bremer (10) Patent No.: US 7,289,604 B2
(45) Date of Patent: Oct. 30, 2007

(54) SYSTEM AND METHOD FOR SUBSCRIBER LOOP TESTING

(75) Inventor: Gordon Bremer, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 11/108,258

(22) Filed: Apr. 18, 2005

(65) Prior Publication Data

US 2005/0180545 A1    Aug. 18, 2005

Related U.S. Application Data

(63) Continuation of application No. 09/907,870, filed on Jul. 18, 2001, now Pat. No. 6,885,730.

(60) Provisional application No. 60/219,395, filed on Jul. 19, 2000.

(51) Int. Cl.
*H04M 1/24* (2006.01)
*H04M 3/08* (2006.01)
*H04M 3/22* (2006.01)

(52) U.S. Cl. .................. 379/29.01; 379/1.01; 379/1.04; 379/22; 379/27.01

(58) Field of Classification Search ............... 379/1.01, 379/1.03, 10.01, 10.02, 10.03, 14.01, 22–24, 379/27.01–31; 324/500, 600; 370/241–253; 375/213, 219–225
See application file for complete search history.

(56) References Cited

U.S. PATENT DOCUMENTS

| | | | |
|---|---|---|---|
| 4,034,161 A | 7/1977 | Hoppough | ................... 179/18 |
| 4,639,557 A * | 1/1987 | Butler et al. | ............. 379/29.02 |
| 5,528,661 A | 6/1996 | Siu et al. | ....................... 379/27 |
| 6,014,425 A | 1/2000 | Bingel et al. | ................... 379/27 |
| 6,185,419 B1 * | 2/2001 | Sasin et al. | .................. 455/423 |
| 6,189,031 B1 | 2/2001 | Badger et al. | ............. 709/224 |
| 6,292,539 B1 | 9/2001 | Eichen et al. | ............. 379/1.04 |
| 6,301,336 B1 | 10/2001 | Branton, Jr. et al. | ..... 379/29.01 |
| 6,477,238 B1 * | 11/2002 | Schneider et al. | ....... 379/22.04 |
| 6,885,730 B1 * | 4/2005 | Bremer | .................... 379/29.01 |

FOREIGN PATENT DOCUMENTS

WO    WO 02/058369    10/2001

OTHER PUBLICATIONS

U.S. Appl. No. 09/573,518, filed May 17, 2000, entitled "Method and Apparatus for Automatic Selection and Operation of a Subscriber Line Spectrum Class Technology," to Gordon Bremer.
International Telecommunication Union, "Data Communication Over the Telephone Network, Loop Test Devices for Modems," v. 54, pp. 1-17, prior Jul. 19, 2000.

* cited by examiner

*Primary Examiner*—Quoc Tran
(74) *Attorney, Agent, or Firm*—Thomas, Kayden, Horstemeyer & Risley, LLP (57) ABSTRACT

A method for testing subscriber loop conditions includes receiving test signal data from a test signal provider, receiving a request for transmitting a test signal described by the test signal data, and transmitting the test signal over a communication channel. The test signal may correspond to a pre-qualification test signal, a qualification test signal, or an in-service test signal. Test results may be transmitted to the test signal provider or to some other designated recipient.

20 Claims, 11 Drawing Sheets

SYSTEM AND METHOD FOR SUBSCRIBER LOOP TESTING

CROSS REFERENCE TO RELATED APPLICATION

This application is a continuation application of Ser. No. 09/907,870, filed Jul. 18, 2001 now U.S. Pat. No. 6,885,730, which claims priority to copending U.S. provisional application Ser. No. 60/219,395, filed on Jul. 19, 2000, which is entirely incorporated herein by reference.

FIELD OF THE INVENTION

The present invention relates generally to the field of digital subscriber line (DSL) communication systems, and more particularly, to a system and method for testing subscriber loop conditions for DSL communications.

BACKGROUND OF THE INVENTION

With the explosion in the growth of Internet usage among both businesses and households, telephone companies have been pressured to provide affordable, high bandwidth access that will support high-speed multimedia services, such as video on demand, high speed Internet access, and video conferencing. To meet this demand, telephone companies are increasingly turning to xDSL technology. The xDSL technology, while having several different embodiments, can provide throughput rates over 100 times faster than that available through traditional 56 kbps modems.

The following are some of the xDSL technologies that are either available today or are currently being tested on a trial basis: Asymmetric Digital Subscriber Line (ADSL), which has a throughput of 32 kbps to 8.192 Mbps downstream to the customer and 32 kbps to 1.088 Mbps upstream to the network; Rate Adaptive Asymmetric Digital Subscriber Line (RADSL), which is a rate adaptive variation of ADSL; High-bit-rate Digital Subscriber Line (HDSL), which offers full duplex throughput at T1 (1.544 Mbps) or E1 (2.048 Mbps) data rates; Symmetric Digital Subscriber Line (SDSL), which provides bi-directional throughput at data rates ranging from 160 Kbps-2.084 Mbps; and Very high-bit-rate Digital Subscriber Line (VDSL), which provides high data rates for customers close to the central office (e.g., 51 Mbps for subscribers within 1000 feet). But most importantly, xDSL technologies offer these high data rates over a standard copper telephone line. Thus, with such a large, embedded copper network already in place, network operators view xDSL technology as a means for extending the life of their investment in copper by many years.

Not all copper telephone line connections, or subscriber loops, between a central office and customer locations, however, are suitable for transmitting xDSL signals. A subscriber loop may, for example, include loading coils that would prevent the successful implementation of xDSL communication. Therefore, it is often necessary to conduct pre-qualification tests to identify potential communication impairments and to determine the likelihood that a DSL modem, if installed at a certain subscriber premises, will perform according to the proposed service offering. Furthermore, once a DSL modem is installed at a customer premises, qualification tests and in-service tests are often used to determine existing communication impairments and to compare DSL modem performance against the proposed service offering.

Subscriber loop testing is very important to DSL service providers, especially for the purpose of qualifying and provisioning a loop for DSL operation. The importance of such testing is highlighted by the creation of new companies, such as Turnstone, that specialize in subscriber loop testing. This need for testing may accelerate as the American National Standards Institute (ANSI) Spectrum Management Standard reaches approval, and as Competitive Local Exchange Carriers (CLECs) challenge loop parameter allegations of Incumbent Local Exchange Carriers (ILECs). This testing will be crucial not only at initial installation, but afterward as loop conditions change due to more DSL crosstalk from the ever-increasing number of DSL services. Moreover, as higher performing DSL equipment becomes available, newer tests may be developed for conducting pre-qualification and qualification testing.

Presently, loop testing is segregated into three types: (1) Portable test equipment that a technician applies temporarily to the loop to be tested; (2) permanent, dedicated loop test equipment placed in-line with DSLAMs; and (3) loop test equipment housed inside DSLAMs with test functions switched onto the line to be tested. ILECs also have metallic line testing (MLT) that is restricted to public telecommunication systems (PTS) frequencies. Traditionally, however, each of the above mentioned test equipment only offers a limited number and variety of subscriber loop tests. Therefore, there exists a need for a subscriber loop testing system that is capable of efficiently and effectively performing a greater number and variety of subscriber loop tests.

SUMMARY OF THE INVENTION

The present invention is directed to a system and method for testing subscriber loop conditions. A method of the present invention includes receiving test signal data from a test signal provider, receiving a request for transmitting a test signal described by the test signal data, and transmitting the test signal over a subscriber loop. The test signal may correspond to a pre-qualification test signal, a qualification test signal, or an in-service test signal. Test results may be transmitted to the test signal provider or to some other designated recipient. A system of the present invention includes a control program that is configured to cause a test signal to be transmitted over a subscriber loop in response to receiving a request for transmitting the test signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims. Furthermore, all examples provided herein are intended to be non-limiting.

I. System Overview

Figure 1:
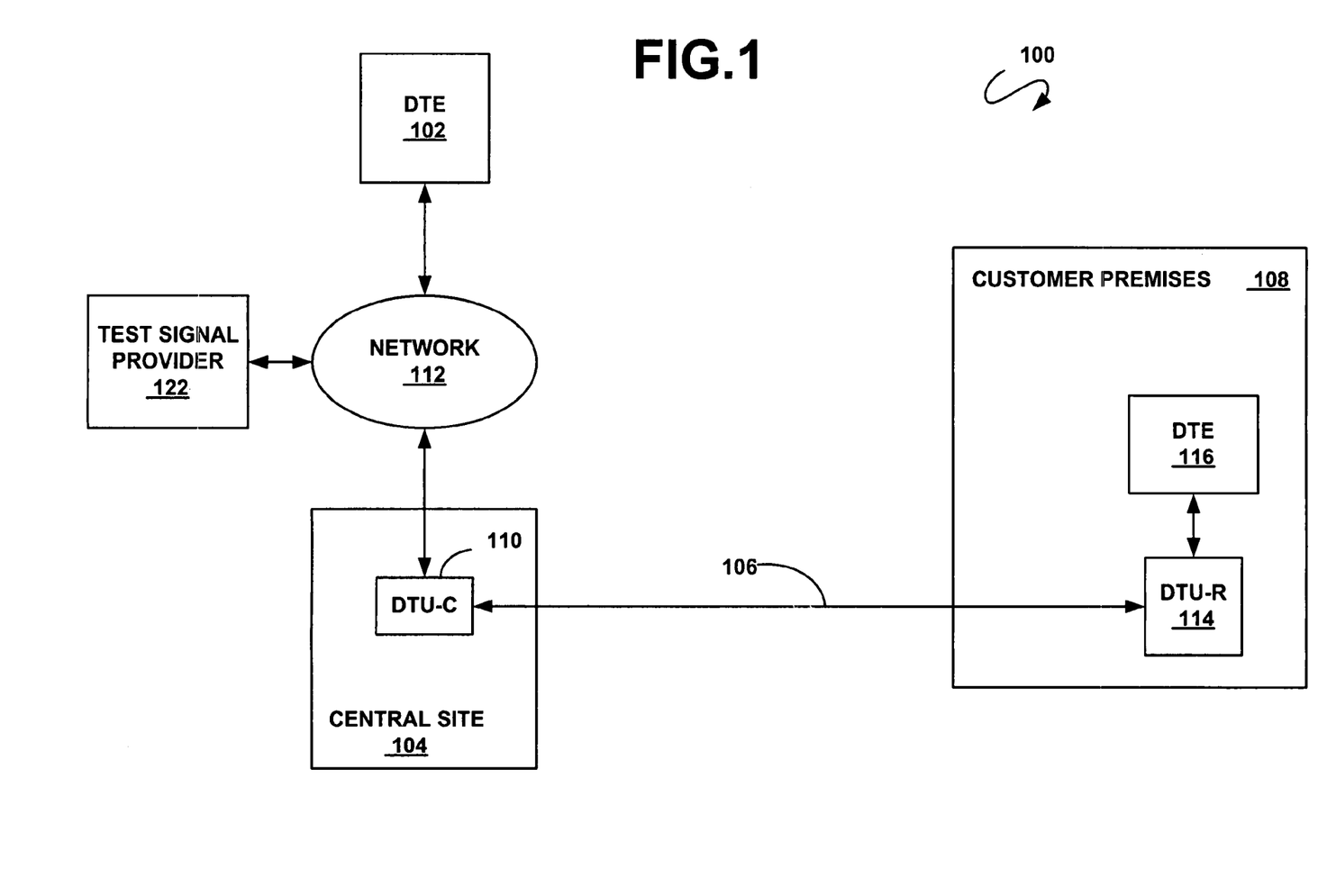
FIG. 1 is a block diagram illustrating an example of a communication system in which an embodiment of the present invention may be employed.

FIG. 1 is a block diagram illustrating a non-limiting example of a communication system 100 in which an embodiment of the present invention may be implemented. Communication system 100 includes a DTE 102, a DTE 1116, a central site 104, a subscriber loop 106, a network 112, and a customer premises 108. Subscriber loop 106 may be a copper wire pair for delivering DSL and telephone services, and is commonly referred to as a "local loop," or a "subscriber loop." Customer premises 108 includes a remote data transceiver unit (DTU-R) 114 and a DTE 116, whereas central site 104 includes a central data transceiver unit (DTU-C) 110. The data transceiver units DTU-C 110 and DTU-R 114 may be, for example, DSL modems. DTE 116 is capable of communicating with DTE 102 with the help of data transceiver units 110 and 114. Each DTE may be, for example, a personal computer (PC), a lap-top computer, a main-frame computer, or some other data processing device.

DTU-C 110 is coupled to DTE 102 via a network 112 and to DTU-R 114 via channel 106. Network 112 may be, for example, the Internet, an asynchronous transfer mode (ATM) network, or some other data communication network. Customer premises 108 may also include a plain old telephone service (POTS) device (not shown). A POTS device communicates using voice-band frequency signals and may be, for example, a telephone or a fax machine. A low pass filter is typically installed between subscriber loop 106 and any existing POTS device to prevent DSL signals from interfering with POTS signals. In an alternative embodiment, the DTU-R 114 and a POTS device interface with subscriber loop 106 via a splitter (not shown) so that POTS signals and DSL signals do not interfere with each other.

According to one embodiment of the present invention, DTU-C 110 is capable of communicating with DTU-R 114 using a DSL technology (xDSL), such as, for example, an asynchronous DSL (ADSL), high bit rate DSL (HDSL), symmetric DSL (SDSL), multi-rate SDSL (MSDSL), rate adaptive DSL (RADSL), etc. Furthermore, it is or will be apparent to those of ordinary skill in the art, that the systems and methods of the present invention may be employed in other communication systems that do not use xDSL technologies.

One or more test signal providers (TSP) 122 may be coupled to DTU-C 110 either through network 112 or through some other means (not shown). TSP 122 may be, for example, a loop test service provider, a craft tester, or a network management system (NMS) device. A TSP 122 can provide DTU-C 110 with one or more test signals for testing the subscriber loop 106. DTU-C 110 may use a test signal provided by a TSP 122 to conduct a pre-qualification test, a qualification test, or an in-service test. The following tables provide examples of tests that may be performed by the DTU-C 110.

TABLE 1

Pre-Qualification Tests

| # | Test Name | Test Objective |
|---|---|---|
| 1. | Premises MVL not Operational | Verify that no premises MVL is operational. |
| 2. | POTS Available | Report if POTS service is present |
| 3. | Loading Coils Present | Report if one or more loading coils are present |
| 4. | POTS Splitter Present | Report if a CO/DSL POTS splitter is connected |
| 5. | On/Off Hook | Report if POTS service is active (monitor for state change during all other tests) |
| 6. | Interfering POTS Activity | Report activity that may adversely impact other results. Indicate if phone filters recommended. |
| 7. | DSL/CO Average Noise | Report average dBm noise power in the MVL band |
| 8. | DSL/CO Impulse Noise | Report dBm noise peaks and occurrences per minute in the MVL band. |
| 9. | DSL/CO Noise Spectrum | Report noise as dBm/Hz in 4 kHz bands from 4 kHz to 92 kHz. |
| 10. | DSL/CO Crosstalk | Report likelihood that noise is from an identified crosstalk source. |
| 11. | DSL/CO Tonal Interferences | Report specific single frequency interferences above some threshold and their dBm levels in the 4 kHz to 92 kHz band. |
| 12. | MVL Performance Prediction | Report an estimate of the probable upstream and downstream MVL rates |

TABLE 2

Qualification Tests

| # | Test Name | Test Objective |
|---|---|---|
| 1. | Premises MVL Operational | Verify that the addressed premises MVL is operational |
| 2. | POTS Available | Report if POTS service is present |
| 3. | Loading Coils Present | Report if one or more loading coils are present |
| 4. | POTS Splitter Present | Report if a CO/DSL POTS splitter is connected |
| 5. | Loop Length Estimate | Report estimate of loop length as both AWG26 and AWG24. |
| 6. | Downlink Loop Characteristic | Report CO/DLC to premises loss at 4 kHz increments from 4 kHz to 92 kHz |
| 7. | Uplink Loop Characteristic | Report premises to CO/DLC loss at 4 kHz increments from 4 kHz to 92 kHz |
| 8. | On/Off Hook | Report if POTS service is active (monitor for change of state during all other tests) |
| 9. | Phone Filter Present | Report if a premises phone filter is associated with off-hook phone |
| 10. | Interfering POTS Activity | Report activity that may adversely impact other results. Indicate if phone filter recommended. |
| 11. | CO/DLC Non-Linear Distortion | Report NLD due to 20 kHz tone at transmit levels from −18 dBm to +10 dBm in 1 dB steps. Run test both on/off-hook. |
| 12. | Premises Non-Linear Distortion | Report NLD due to 20 kHz tone at transmit levels from −18 dBm to +10 dBm in 1 dB steps. Run test both on/off-hook. |
| 13. | DSL/CO Average Noise | Report average dBm noise power in the MVL band. Report both on/off-hook. |
| 14. | Premises Average Noise | Report average dBm noise power in the MVL band. Report both on/off-hook. |
| 15. | DSL/CO Impulse Noise | Report dBm noise peaks and occurrences per minute in the MVL band. Report both on/off-hook. |
| 16. | Premises Impulse Noise | Report dBm noise peaks and occurrences per minute in the MVL band. Report both on/off-hook. |
| 17. | DSL/CO Noise Spectrum | Report noise as dBm/Hz in 4 kHz bands from 4 kHz to 92 kHz. Report both on/off-hook. |
| 18. | Premises Noise Spectrum | Report noise as dBm/Hz in 4 kHz bands from 4 kHz to 92 kHz. Report both on/off-hook. |
| 19. | DSL/CO Crosstalk Type | Report likelihood that noise is from an identified crosstalk source. Report both on/off-hook. |
| 20. | Premises Crosstalk Type | Report likelihood that noise is from an identified crosstalk source. Report both on/off-hook. |
| 21. | DSL/CO Tonal Interferences | Report specific single frequency interferences above some threshold and their dBm levels in the 4 kHz to 92 kHz band. Report both on/off-hook. |
| 22. | Premises Tonal Interferences | Report specific single frequency interferences above some threshold and their dBm levels in the 4 kHz to 92 kHz band. Report both on/off-hook. |
| 23. | Downstream Data Rate | Report actual operational maximum error-free data rate. Report transmit level. Report both on/off-hook. |
| 24. | Upstream Data Rate | Report actual operational maximum error-free data rate. Report transmit level. Report both on/off-hook. |

TABLE 3

In-Service Tests

| # | Test Name | Test Objective |
|---|---|---|
| 1. | Premises MVL Operational | Verify that the addressed premises MVL is operational |
| 2. | On/Off Hook | Report if POTS service is active (monitor for state change during all other tests) |
| 3. | Downstream Data Rate | Report downstream line data rate. Report transmit level. Run test both on/off-hook. |
| 4. | Upstream Data Rate | Report upstream line data rate. Report transmit level. Run test both on/off-hook. |
| 5. | Downstream Block Test | Perform interruptive bi-directional block test. Report downstream erred block count. |
| 6. | Upstream Block Test | Perform above test. Report erred upstream block count. |
| 7. | Downstream User Byte Count | Report running count of received premises user bytes modulo $2^{32}$, measured at layer 1. |
| 8. | Upstream User Byte Count | Report running count of received CO/DLC user bytes modulo $2^{32}$, measured at layer 1. |
| 9. | Downstream Data Efficiency | Report count of attempted downstream transmissions and erred transmissions |
| 10. | Upstream Data Efficiency | Report count of attempted downstream transmissions and erred transmissions |
| 11. | POTS State Change Count | Report running count of on/off state changes modulo $2^{16}$. |
| 12. | Retrain Count | Report running count of link retrain events modulo $2^{16}$. |
| 13. | CO/DLC Receive Level | Report CO/DLC received level in dBm. |
| 14. | Premises Receive Level | Report premises received level in dBm. |
| 15. | CO/DLC Receive Ratio | Report CO/DLC equalized SNR in dB. |
| 16. | Premises Receive Ratio | Report premises equalized SNR in dB. |

The pre-qualification tests involve testing a subscriber loop from a central site 104 without a DTU-R 114 being connected to the subscriber loop at the customer premises. The accuracy of these tests is limited due to the absence of known termination and DTU-R 114 equipment at the customer premises 108. The first objective of these tests is to estimate, prior to any premises installation, the likelihood that a DTU-R 114, if installed at the subscriber premises, will perform according to the proposed service offering. The second objective of these tests is to identify impairments that may limit performance of the DTU-R 114 once installed at the subscriber premises.

The qualification tests involve testing from a DTU-C 110 at a central site 104 in conjunction with a DTU-R 114 located at the customer premises, but with the DTU-R 114 service being disrupted or disabled. Each DTU-R 114 can be individually tested, if desired. The accuracy of these tests is high due to using the DTU-R 114 equipment in conjunction with the testing equipment located at the central site 104. The first objective of these tests is to establish DTU-R 114 performance compared to the proposed service offering. The second objective is to identify impairments that may limit the performance of the DTU-R 114.

The in-service tests involve testing from a DTU-C 110 at a central site 104 in conjunction with a DTU-R 114 located at the customer premises, but without interfering with normal operational of the DTU-R 114. Each DTU-R 114 can be individually tested, if desired. The accuracy of these tests is high. The first objective of these tests is to measure the performance of a DTU-R 114 according to the proposed service offering. A second objective is to report impairments that may lead to either performance improvements or the offering of higher performance services.

Communication system 100 permits a DTU-C 110 to perform third-party commanded and monitored pre-qualification, qualification, and in-service loop testing as well as spectrum management class determination. According to one embodiment, a DTU-C 110 receives, stores and later transmits onto a subscriber loop, upon command, arbitrary test signals that have been electronically communicated to that modem by a remotely located TSP 122. The DTU-C 110 then records and later electronically communicates to the TSP 122 the responsive local subscriber loop signals. The TSP 122 can evaluate the results immediately or at any time in the future. In fact, the results can be analyzed at a later time using an analysis tool that was not even contemplated at the time of the testing. The test signals may be communicated in a parameter format in which the test signals are characterized so that the entire test signal itself need not be communicated. Communication of test signals, commands and responses can be, for example, via an ATM network.

Communication system 100 allows several TSPs 122 to utilize their own proprietary testing capabilities. These capabilities can be readily changed and improved by third parties from time to time. Each TSP 122 can create a test signal suite, communicate each signal or the entire suite to the modem where it is stored, then request or command test signal transmission onto the subscriber loop. The format for communicating parameters, controls and signals can be standardized to allow for virtually any practical test signal to be defined and utilized by a third party tester. This permits the DTU-C 110 to offer the authoritative test expertise of well known companies such as, for example, Hiekemian™, Hewlett-Packard™ and Turnstone™. As a result, an open testing access point or portal may be created on each end of every subscriber loop to which DTU-Cs 110 are connected. This access point or portal can be accessed by any number of testers that utilize their own testing techniques.

Communication system 100 also enables a method of doing business wherein the DTU-C 110 vendor can offer to third-party test vendors the opportunity to gain test access to subscriber loops from any desired location served by a DTU-C 110 that is provided by the vendor. In this manner, a DTU-C vendor can offer its customers authoritative tests such as, for example, "Heikemian-Inside," "HP-Inside," and "Turnstone-Inside" tests in addition to any vendor created tests. Furthermore, test vendors would be able to offer their customers a system, similar to an NMS system, that provides large scale loop testing and spectrum management class determination.

II. Components of System

For ease of illustration, a single DTU-C 110 and a single DTU-R 114 will be described below. However, the following description is equally applicable to a system containing one or more central data transceiver units 110, each capable of communicating with multiple remote data transceiver units 114.

Figure 2:
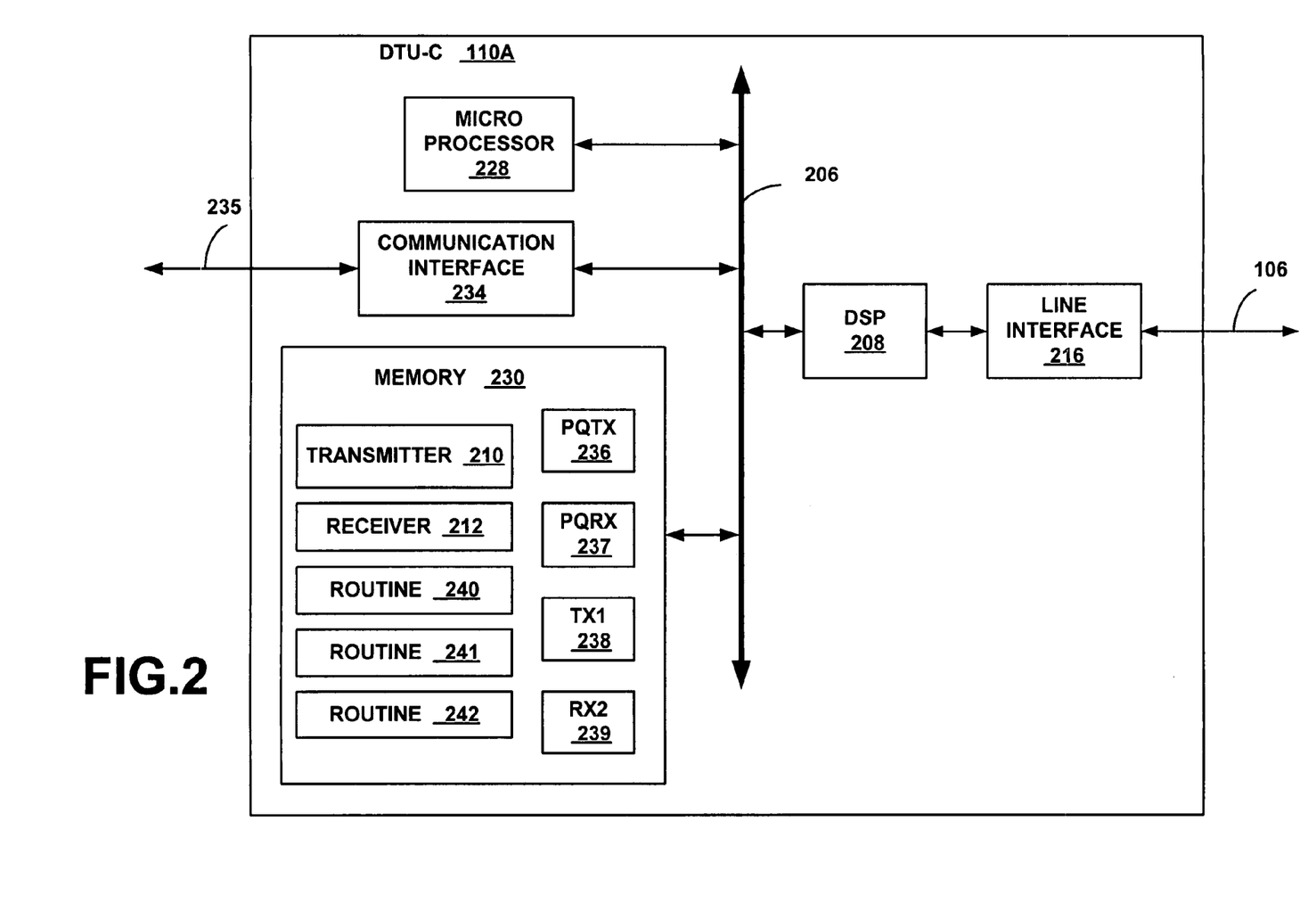
FIG. 2 is a block diagram illustrating one of a number of potential embodiments of the central data transceiver unit of FIG. 1.

FIG. 2 is a block diagram of a DTU-C 110A that illustrates one possible configuration of a DTU-C of the present invention. Generally, in terms of hardware architecture, as shown in FIG. 2, the DTU-C 110A includes a microprocessor 228, a communication interface 234, a digital signal processor (DSP) 208, and a memory 230 that are communicatively coupled via a local interface 206. The local interface 206 can be, for example but not limited to, one or more buses or other wired or wireless connections, as is known in the art. The local interface 206 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The microprocessor 228 is a hardware device for executing software, particularly that stored in memory 230. The microprocessor 228 can be any custom made or commercially available processor, a central processing unit (CPU), an auxiliary processor among several processors associated with the DTU-C 110A, a semiconductor based microprocessor (in the form of a microchip or chip set), a macroprocessor, or generally any device for executing software instructions.

The memory 230 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 230 may incorporate electronic, magnetic, optical, and/or other types of storage media. Note that the memory 230 can have a distributed architecture, where various components are situated remote from one another, but can be accessed by the microprocessor 228.

The software in memory 230 may include one or more separate programs, each of which comprises an ordered listing of executable instructions for implementing logical functions. In the example of FIG. 2, the software in the memory 230 includes the testing routines 240-242 in accordance with the present invention and a suitable operating system (O/S; not shown). The operating system essentially controls the execution of other computer programs, such as the testing routines 240-242, and provides scheduling, input-output control, file and data management, memory management, and communication control and related services.

The testing routines 240-242 are a source program, executable program (object code), script, or any other entity comprising a set of instructions to be performed. When a source program, then the program needs to be translated via a compiler, assembler, interpreter, or the like, which may or may not be included within the memory 230, so as to operate properly in connection with the O/S. Furthermore, the testing routines 240-242 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

When the DTU-C 110A is in operation, the microprocessor 228 is configured to execute software stored within the memory 230, to communicate data to and from the memory 230, and to generally control operations of the DTU-C 110A pursuant to the software. The testing routines 240-242 and the O/S, in whole or in part, but typically the latter, are read by the microprocessor 228, perhaps buffered within the microprocessor 228, and then executed.

When the testing routines 240-242 are implemented in software, as is shown in FIG. 2, it should be noted that the testing routines 240-242 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The testing routines 240-242 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the testing routines 240-242 are implemented in hardware, the testing routines 240-242 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Although DSP 208 as illustrated implements transmitter 210 and receiver 212, these modules (210 & 212) may alternatively be implemented via separate components. DSP 208 gains access to subscriber loop 106 via line interface 216. DTU-C 110A receives test signal data from a test signal provider 122 (FIG. 1) via communication interface 234 and stores the data in memory 230. DTU-C 110A may receive and store multiple sets of test signal data from various test signal providers 122. After the DTU-C 110A receives a request for a specific type of test, it transmits a test signal corresponding to the requested test over the subscriber loop 106 using DSP 208 and line interface 216. In this example, DTU-C 110A receives and stores a pre-qualification test signal PQTX 236 and another test signal TX1 from a test signal provider 122 and stores the test signals in memory 230. TX1 may be, for example, a qualification test signal or an in-service test signal. PQTX 236 or TX1 may be transmitted over subscriber loop 106 via DSP 208 and line interface 216 in order to conduct a subscriber loop test that is requested by the test signal provider 122 or some other requesting party.

Figure 3:
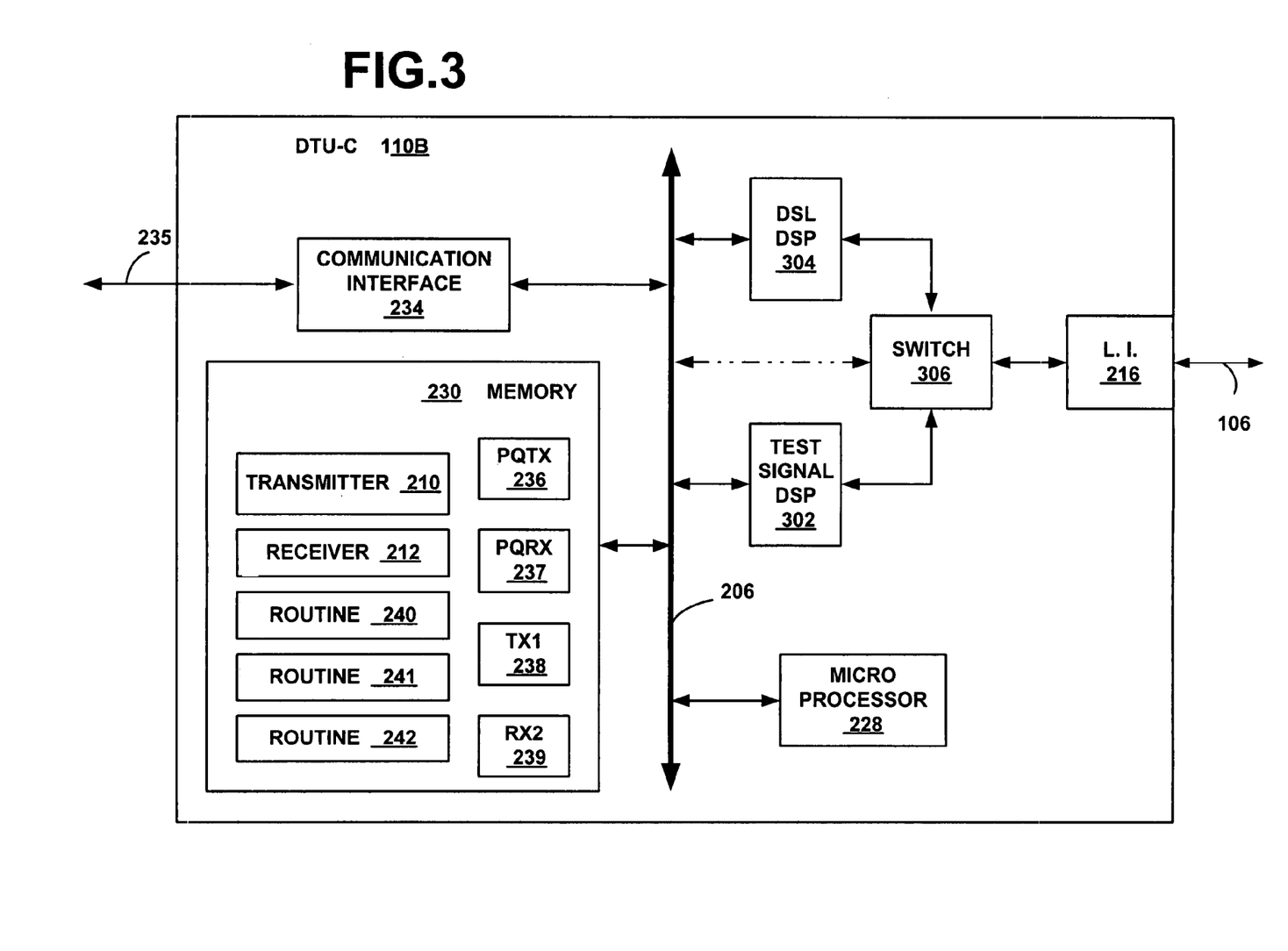
FIG. 3 is a block diagram illustrating another embodiment of the central data transceiver unit of FIG. 1.

FIG. 3 is a block diagram of a DTU-C 110B that illustrates another possible configuration of a DTU-C of the present invention. Similar to DTU-C 110A (FIG. 2), DTU-C 110B includes a microprocessor 228, a memory 230, and a communication interface 234 that are coupled to a data local interface 206. However, DTU-C 110B differs from DTU-C 110A in that it includes two DSPs 302 & 304 for transmitting test signals and xDSL communication signals, respectively.

The DSPs 302 & 304 are coupled to line interface 216 via a switch 306. The switch is controlled via microprocessor 228 such that only one of the DSPs 302 & 304 is in communication with line interface 216 at any given time.

Figure 4:
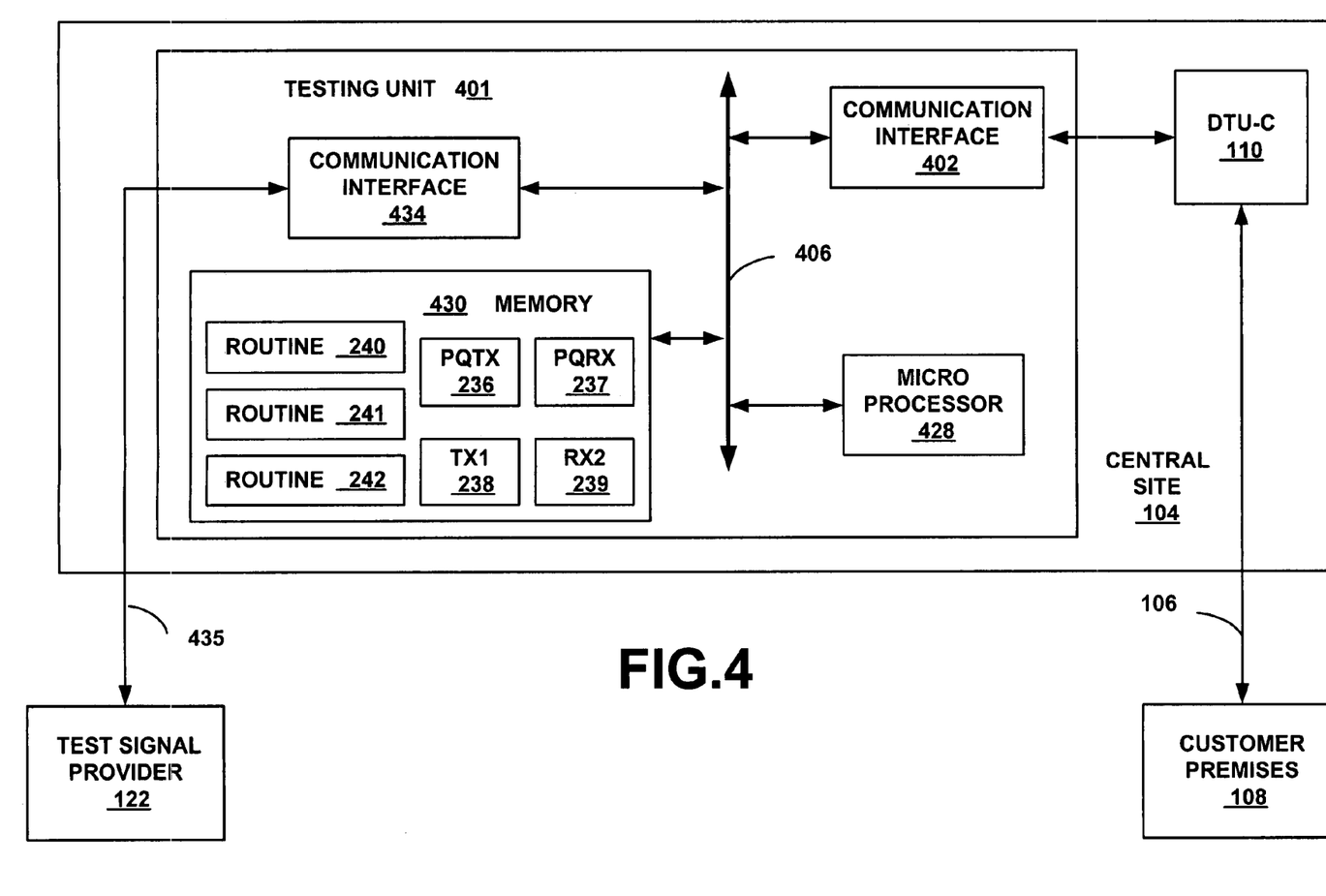
FIG. 4 is a block diagram illustrating an alternative embodiment to the communication system illustrated in FIG. 1.

FIG. 4 is a block diagram illustrating a non-limiting example of a communication system comprising a central site 104, a test signal provider 122, and a customer premises 108. Central site 104 houses a testing unit 401 and a DTU-C 110. Testing unit 401 comprises a microprocessor 428, a memory 430, and communication interfaces 402 & 434 that are coupled to a local interface 406. Memory 430 and microprocessor 428 work in cooperation to store and execute a testing routine 240. Testing unit 401 receives subscriber loop test signal data from a test provider 122 via communication interface 434, and stores it in memory 430 as PQTX 236 and/or TX1 238. Testing unit 401 may receive and store multiple sets of test signal data from various subscriber loop test vendors. After the testing unit 401 receives a request for performing a subscriber loop test, it transmits a corresponding test signal to a DTU-C 110 which in turn transmits the test signal over the subscriber loop 106.

Figure 5:
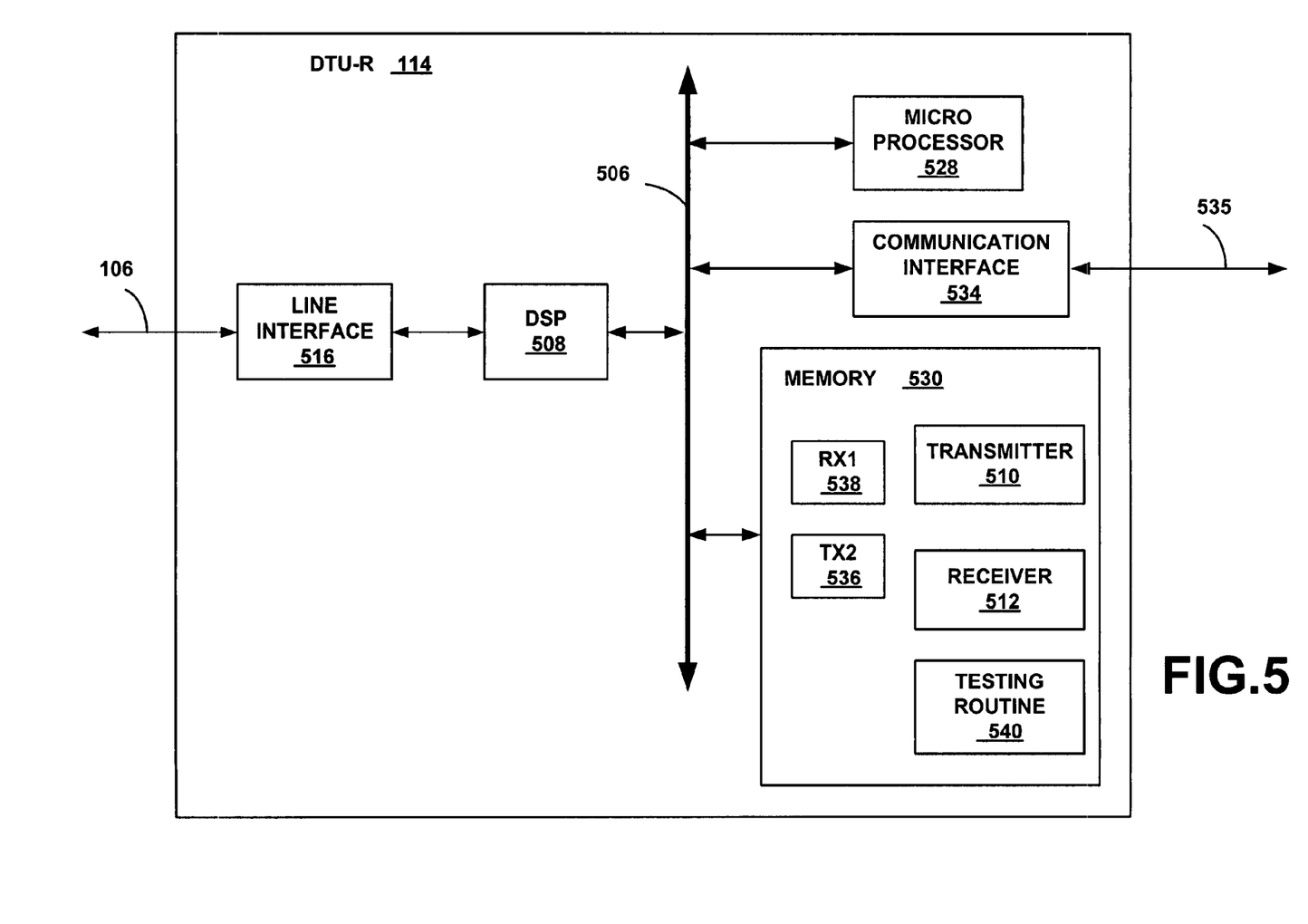
FIG. 5 is a block diagram illustrating one of a number of potential embodiments of the remote data transceiver unit of FIG. 1.

FIG. 5 is a block diagram of a DTU-R 114 that illustrates one possible configuration of a DTU-R of the present invention. DTU-R 114 includes a microprocessor 528, a memory 530, a communication interface 534, and a digital signal processor (DSP) 508 that are coupled to a local interface 506. Memory 530 and microprocessor 528 work in cooperation to store and execute a testing routine 540. Although DSP 508 as illustrated implements transmitter 510 and receiver 512, these modules (510 & 512) may alternatively be implemented via separate components. DSP 508 gains access to subscriber loop 106 via line interface 516. In one embodiment, DTU-R 114 receives test signal data from a test signal provider 122 (FIG. 1) and stores it in memory 530 as TX2 536. DTU-R 114 transmits test signal TX2 536 over the subscriber loop 106 via DSP 508 and line interface 516 after receiving a request for transmitting the test signal. The transmitted test signal TX2 536 is received and stored at a central site 104 (FIG. 1) as RX2 239. DTU-R 114 may also receive a test signal RX1 538 that is originally transmitted from a central site 104 as TX1 238 (e.g. FIG. 2). The received test signal RX1 538 is stored in memory 530 and is subsequently transmitted to a designated recipient such as, for example, test signal provider 122.

III. System Operation and Functionality

Figure 6:
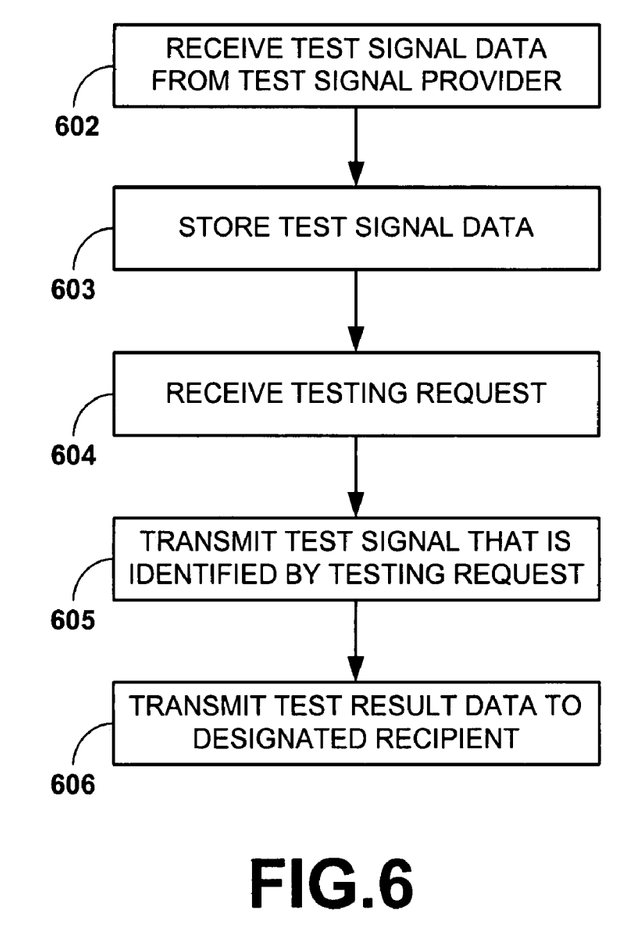
FIG. 6 is a flow chart illustrating a method of testing conditions in the subscriber loop depicted in FIG. 1.

FIG. 6 is a flow chart illustrating one possible implementation of subscriber loop testing of the present invention. The flow chart steps 602-606 may be implemented via a DTU-C 110 and/or another device located at a central site 104. For ease of illustration, the steps 602-606 will be discussed as being performed by a DTU C 110. As indicated in step 602, a DTU-C 110 receives test signal data from test signal provider 122. The test signal provider may be, for example, a loop test service provider, a craft tester, or a network management system (NMS) device. The test signal data includes information necessary to create the desired test signal. Such information may include, for example, desired frequency domain and time domain characteristics, duration, power level, etc. After receiving the test signal data, the DTU-C 110 stores the data in memory, as indicated in step 603. The memory may be located either within or outside the DTU-C 110. Then as indicated in step 604, DTU-C 110 receives a request for testing a subscriber loop 106 using test signals described by the previously received test signal data. In one implementation, the testing request may also be received in conjunction with the test signal data. In response to receiving the testing request, the DTU-C 110 transmits over the subscriber loop a test signal that is identified by the testing request, as indicated in step 605. The test signal may be used to conduct a pre-qualification test, a qualification test, or an in-service test, as discussed above. In the case of pre-qualification testing, the DTU-C 110 is connected to the subscriber loop that is to be tested, but a DTU-R 114 is not. After the test is completed, the DTU-C 110 transmits test result data to a designated recipient, as indicated in step 606. The test result data may describe the transmitted test signal and/or a responsive test signal. The designated recipient may be either the device that originated the testing request or some other destination that is identified by the testing request.

Figure 7:
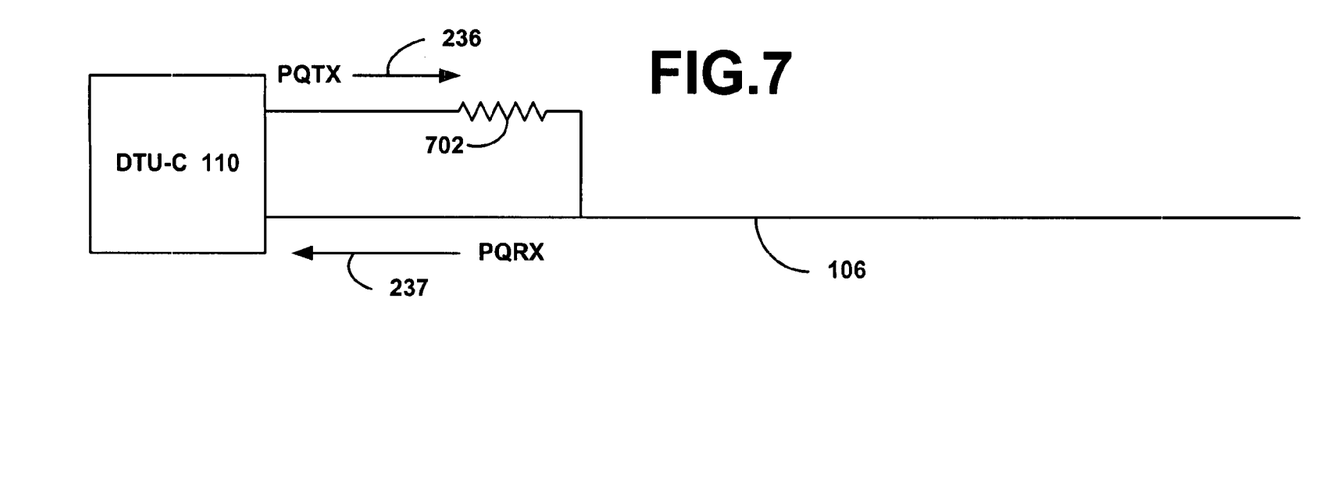
FIG. 7 depicts a pre-qualification test involving the DTU-C depicted in FIG. 1.

FIG. 7 depicts the implementation of a pre-qualification test. During a pre-qualification test, the subscriber loop 106 is connected to a DTU-C 110 but not to a DTU-R 114. When ready, the DTU-C 110 drives the loop through the appropriate line termination impedance 702 using a pre-qualification test signal (PQTX) 236. The line termination impedance 702 may be, for example, 100 ohms. During the time that PQTX 236 is being transmitted, the loop received signal (PQRX) 237 is digitized and stored in memory. At the completion of the test, the DTU-C 110 cooperates with the test signal provider to communicate PQRX 237 data (and optionally the PQTX 236 data) back to the test signal provider 122. These signals can optionally be sent to other locations as well. The test signal provider would then have PQRX 237 and PQTX 236 and could at any time evaluate many loop parameters based upon these signals and the knowledge of the line terminating impedance. Examples of the types of loop parameters that can be evaluated are given in Table 1. Note that the time duration of such a test may be as short as several milliseconds. This would likely permit acceptable interruption of data services, even during heavy usage times.

Figure 8:
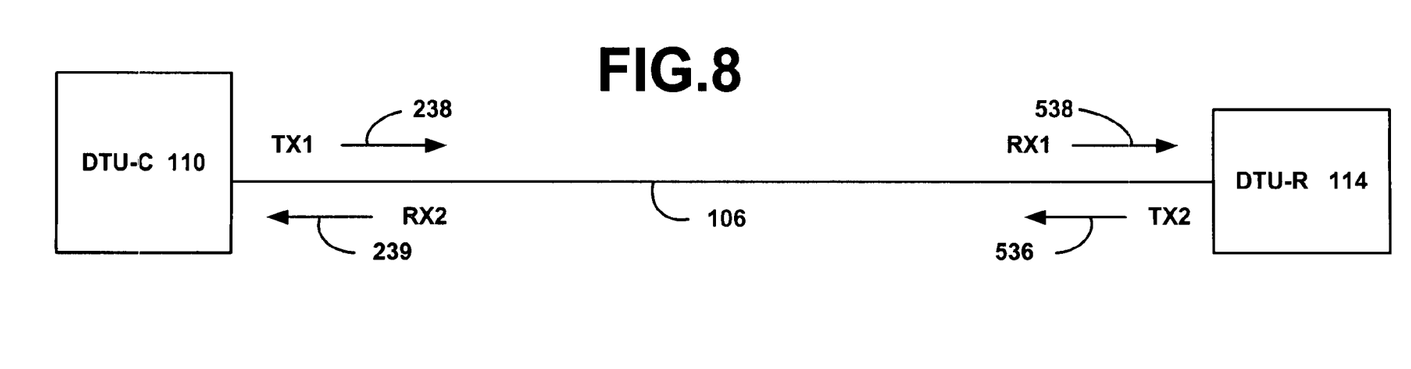
FIG. 8 depicts a subscriber loop test involving the DTU-C and the DTU-R depicted in FIG. 1.

FIG. 8 depicts the implementation of a subscriber loop testing involving a DTU-C 110 and a DTU-R 114. Such testing may correspond to a qualification or an in-service test, as described above. The DTU-C 110 and the DTU-R 114 are installed and connected to the subscriber loop. In the first phase of testing, the DTU-C 110 transmits a test signal TX1 238 and the DTU-R 114 receives and stores the corresponding line signal RX1 538. Messages describing TX1 238 and RX1 538 are then communicated to the test signal provider 122 (FIG. 1) by DTU-C 110 and DTU-R 114, respectively. In the second phase of testing, DTU-R 114 transmits a test signal TX2 536 and the DTU-C 110 receives and stores the corresponding line signal RX2 239. Messages describing TX2 536 and RX2 239 are then communicated to the test signal provider 122 by DTU-R 114 and DTU-C 110, respectively. Thus, the test signal provider 122 has these two sets of TX/RX test signal data and at any time can evaluate many loop parameters based upon these data sets and the knowledge of the line terminating impedance. Examples of the types of loop parameters that can be evaluated are given in Tables 2 and 3. It should be noted that operational parameters of the DTU-C 110 and the DTU-R 114 may also be controlled and monitored by the test signal provider 122, perhaps using conventional NMS techniques.

Figure 9:
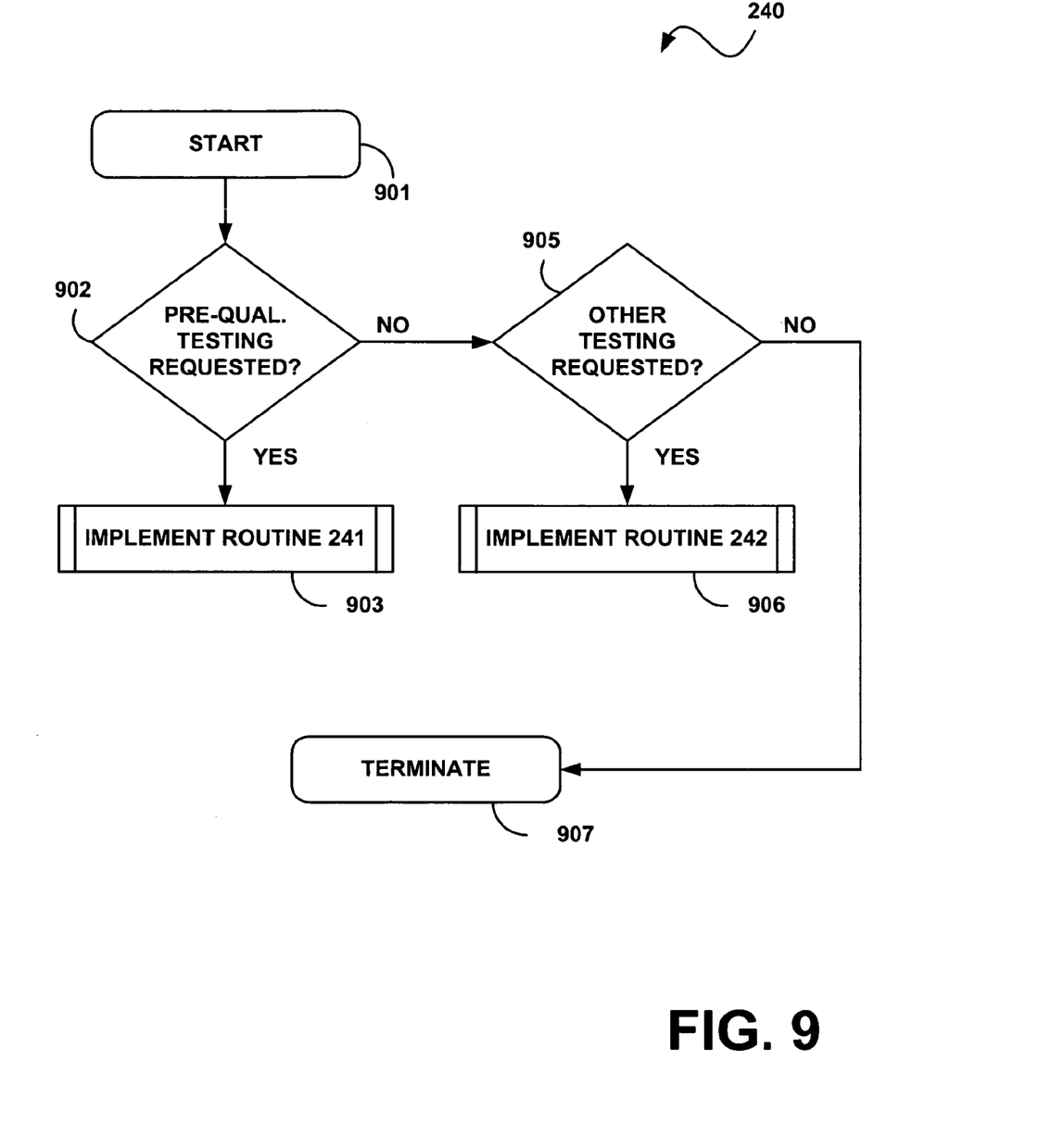
FIG. 9 is a flow chart illustrating a non-limiting example of a testing routine that may be implemented via the DTU-C depicted in FIG. 1.

FIGS. 9-12 are flow charts illustrating non-limiting examples of testing routines 240, 241, and 242 that may be implemented in a DTU-C 110 (FIG. 1, 2, or 3) or a testing unit 401 (FIG. 4). For illustration purposes, routines 240-242 will be discussed with respect to DTU-C 110A (FIG. 3). Referring now to FIG. 9, after routine 240 is initiated, as indicated in step 901, it determines whether pre-qualification testing has been requested since the last time that it was executed, as indicated in step 902. If pre-qualification testing has been requested, then the routine causes routine 241 (FIG. 10) to be executed, as indicated in step 903. However, if pre-qualification has not been requested, then the routine determines whether qualification or in-service testing has been requested, as indicated in step 905. If qualification or in-service testing has been requested, then the routine causes routine 242 (FIG. 11) to be executed, as indicated in step 906. On the other hand, if qualification or in-service testing has not been requested, then the routine terminates, as indicated in step 907.

Figure 10:
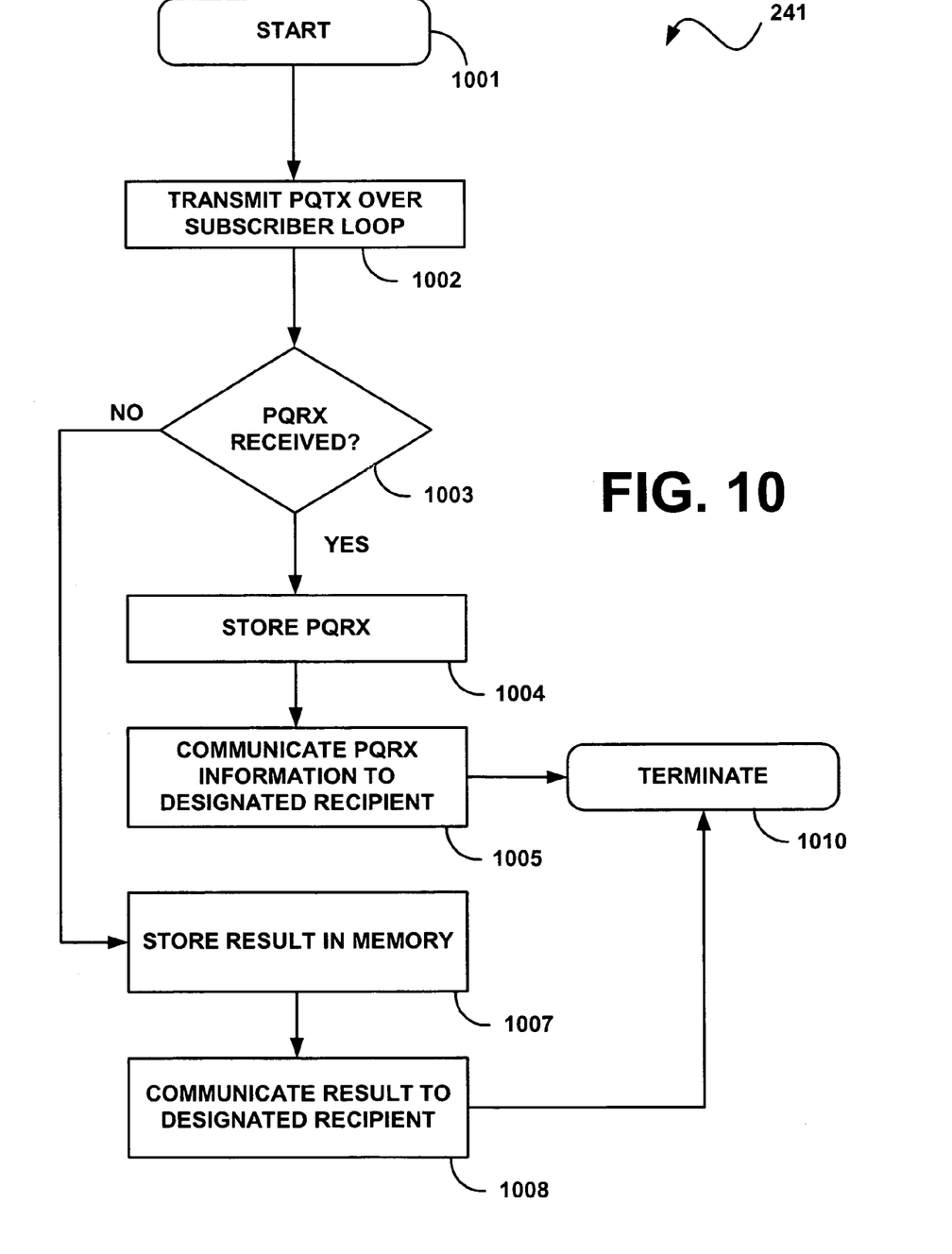
FIG. 10 is a flow chart illustrating a non-limiting example of a pre-qualification testing routine that may be implemented via the DTU-C depicted in FIG. 1.

FIG. 10 is a flow chart illustrating a non-limiting example of a pre-qualification testing routine 241 that may be invoked via testing routine 240 as discussed above. In an alternative embodiment, routine 241 may be invoked merely in response to receiving a request for a pre-qualification test. After routine 241 is initiated as indicated in step 1001, the routine causes a pre-qualification testing signal (PQTX) 236 corresponding to the requested pre-qualification test to be transmitted over the subscriber loop 106, as indicated in step 1002. Then the routine 241 determines whether a responsive signal (PQRX) 237 is received via subscriber loop 106 within a predetermined time period, as indicated in step 1003. If PQRX 237 is received, then routine 241 causes data describing PQRX 237 to be stored in memory and to be transmitted to a designated recipient, as indicated in steps 1004 and 1005, respectively. The designated recipient may be, for example, a loop test service provider, a craft tester, or an NMS. However, if PQRX 237 is not received, then the result, that a responsive signal was not detected, is stored in memory and is communicated to the designated recipient, as indicated in steps 1007 and 1008, respectively. After the result is communicated to a designated recipient, the routine terminates as indicated in step 1010.

Figure 11:
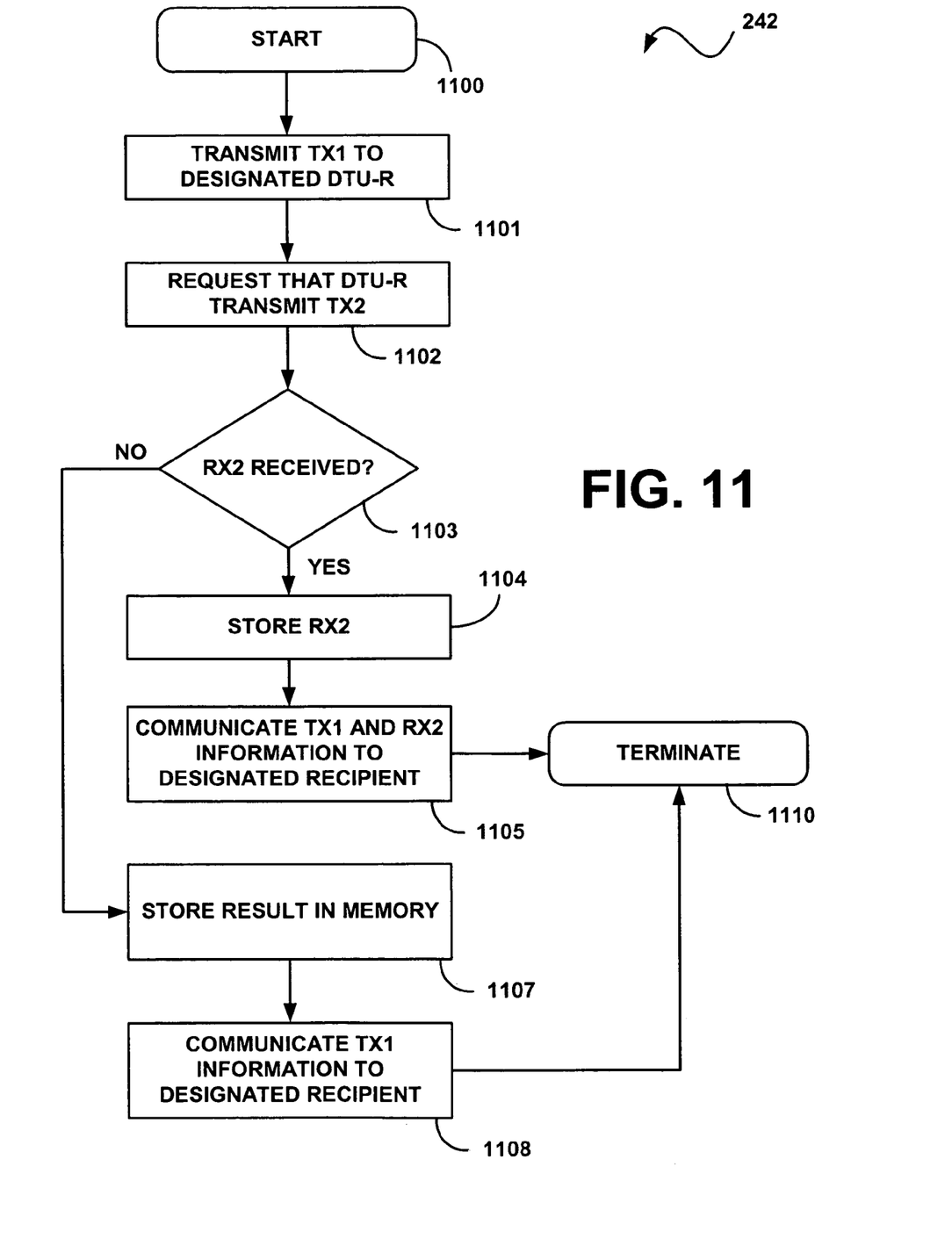
FIG. 11 is a flow chart illustrating a non-limiting example of another testing routine that may be implemented via the DTU-C depicted in FIG. 1.

FIG. 11 is a flow chart illustrating a non-limiting example of a testing routine 242 that may be invoked via testing routine 240 as discussed above. In an alternative embodiment, routine 242 may be invoked merely in response to receiving a request for conducting a certain test. After routine 242 is initiated as indicated in step 1100, the routine causes a testing signal (TX1) 238 corresponding to the requested test to be transmitted over the subscriber loop 106 to DTU-R 114 (FIG. 1), as indicated in step 1101. The routine 242 also causes a request to be transmitted to DTU-R 114 requesting that DTU-R 114 transmit a second testing signal (QTX2) 536 (FIG. 5), as indicated in step 1102. Then the routine 242 determines whether an RX2 signal 239 (corresponding to TX2 536) is received via subscriber loop 106 within a predetermined time period, as indicated in step 1103. If RX2 239 is received, then routine 242 causes data describing RX2 239 to be stored in memory and to be transmitted to a designated recipient, as indicated in steps 1104 and 1105, respectively. However, if RX2 239 is not received, then the test result, that a responsive signal was not received, is stored in memory and is communicated along with TX1 238 to the designated recipient, as indicated in steps 1107 and 1108, respectively. After the result is communicated to a designated recipient, the routine terminates as indicated in step 1110.

Figure 12:
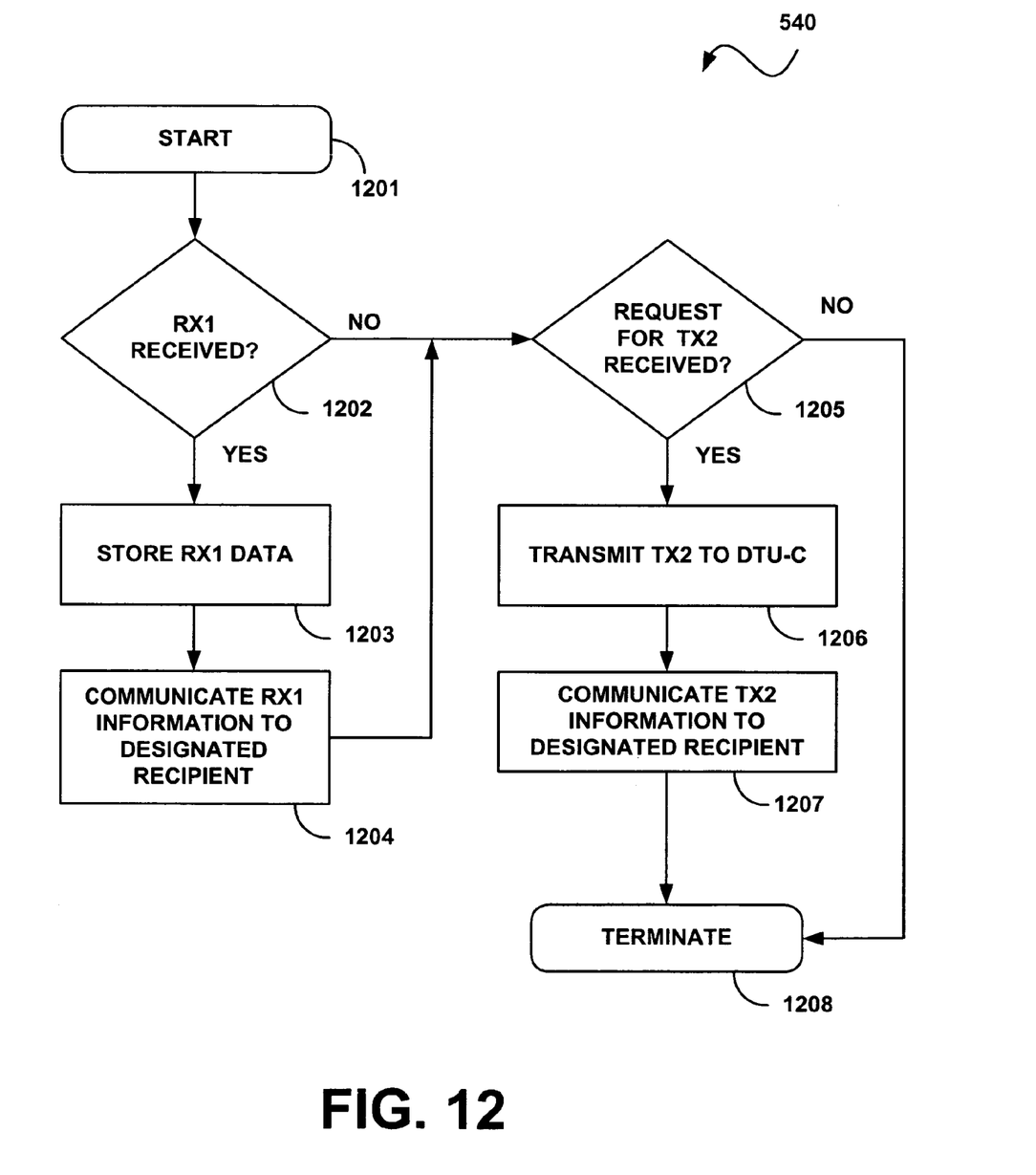
FIG. 12 is a flow chart illustrating a non-limiting example of a testing routine that may be implemented via the DTU-R depicted in FIG. 1.

FIG. 12 is a flow chart illustrating a non-limiting example of a testing routine 540 that may be implemented via a DTU-R 114 (FIG. 5). After the routine 540 is initiated, as indicated in step 1201, the routine determines if DTU-R 114 has received a testing signal RX1 538 within a predetermined time period, as indicated in step 1202. If DTU-R 114 has received RX1 538, then the routine 540 causes data describing RX1 to be stored in memory and to be communicated to a designated recipient, as indicated in steps 1203 and 1204, respectively. However, if DTU-R 114 has not received RX1 538, then it determines whether a request has been received from DTU-C 1 10A (FIG. 2) for transmitting a testing signal TX2 536, as indicated by step 1205. If no such request has been received, then the routine terminates, as indicated in step 1208. On the other hand, if a request has been received for transmitting TX2 536, then routine 540 causes TX2 536 to be transmitted to DTU-C 1 10A over subscriber loop 106, as indicated by step 1206. After TX2 536 is transmitted to DTU-C 11A, DTU-R 114 transmits data describing or identifying TX2 536 to the designated recipient, as indicated in step 1207, and the routine 540 terminates, as indicated in step 1208.

Any blocks or steps shown in FIGS. 9-12 represent modules, segments, or portions of code which include one or more executable instructions for implementing specific logical functions or steps in a process. Alternate implementations are included within the scope of the preferred embodiment of the present invention in which functions or steps may be executed out of order from that shown or discussed, including substantially concurrently or in reverse order, depending on the functionality involved, as would be understood by those reasonably skilled in the art.

It will also be appreciated by those skilled in the art that the functionality provided by each of the routines illustrated in FIGS. 9-12, can also be implemented through hardware (e.g., an application specific integrated circuit (ASIC) and supporting circuitry). Each implementation has its advantages, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

Further, the functionality provided by each of the routines illustrated in FIGS. 9-12, can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanner, and transferred into the computer's memory or storage.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

The invention claimed is:

1. A method for testing a subscriber loop, comprising the steps of:
receiving an arbitrary test signal description from a remote location;
storing the arbitrary test signal description;
receiving a request for transmitting a test signal corresponding to the received test signal; and
responsive to receiving the request, transmitting the test signal over the subscriber loop;
wherein the test signal is configured to enable testing at least one characteristic of the subscriber loop.

2. The method of claim 1, wherein equipment operated by at least one of a loop testing service provider, a craft tester, a loop test vendor, or a network management system (NMS) transmits the request.

3. The method of claim 1, wherein the description describes an arbitrary test signal not already known to the recipient of the description.

4. The method of claim 1, wherein the description includes parameters characterizing the test signal.

5. The method of claim 1, wherein the description includes one or more of desired frequency domain characteristics, time domain characteristics, duration, and power level.

6. The method of claim 1, further comprising the steps of:
generating a test signal based on the received description; and
responsive to the received transmit request, transmitting the generated test signal.

7. The method of claim 1, further comprising the steps of:
after transmitting the test signal, receiving a test signal response; and
transmitting to a designated recipient, over a data network, a test result describing the test signal response,
wherein the designated recipient is indicated in the request for transmitting the test signal.

8. A central data transceiver unit (DTU-C) comprising:
means for receiving at least one arbitrary test signal description from at least one remotely located test signal provider (TSP);
means for storing the at least one test signal description;
means for transmitting at least one test signal corresponding to the received test description along a communication channel; and
means for receiving a response signal from the communication channel.

9. The DTU-C of claim 8, wherein the at least one test signal is used in a pre-qualification test.

10. The DTU-C of claim 8, wherein the transmitting means transmits the at least one test signal along the communication channel to a remote data transceiver unit (DTU-R).

11. The DTU-C of claim 10, wherein the at least one test signal is used in a test selected from a group of tests consisting of a qualification test and an in-service test.

12. The DTU-C of claim 8, further comprising:
means for storing the response signal; and
means for transmitting the response signal to a designated recipient.

13. The DTU-C of claim 12, wherein the designated recipient is the TSP.

14. The DTU-C of claim 12, wherein the means for transmitting the response signal transmits the response signal in a format that can be stored for future evaluation.

15. The DTU-C of claim 8, wherein the means for receiving a response signal receives a plurality of test signals from a plurality of test signal providers.

16. The DTU-C of claim 8, wherein the at least one test signal is communicated in a parameter format in which the test signal is characterized so that the entire test signal itself need not be communicated.

17. A method for testing a subscriber loop, comprising the steps of:
receiving, from a remote location over a data network, an arbitrary test signal configured to enable testing at least one characteristic of the subscriber loop;
storing the received arbitrary test signal;
receiving, over the data network, a request for transmitting the test signal; and
responsive to receiving the request, transmitting the test signal over the subscriber loop.

18. The method of claim 17, further comprising the steps of:
- after transmitting the test signal, receiving a test signal response; and
- transmitting to a designated recipient, over the data network, a test result describing the test signal response, wherein the designated recipient is indicated in the request for transmitting the test signal.

19. The method of claim 18, wherein the designated recipient is other than the sender of the request for transmitting the test signal.

20. The method of claim 18, wherein the test result further describes the transmitted test signal.

* * * * *